Patented Jan. 4, 1944

2,338,209

UNITED STATES PATENT OFFICE 2,338,209

ZIRCON REFRACTORY AND METHOD OF MAKING IT

Robert Karl Smith, Corning, N. Y., assignor to Corning Glass Works, Corning, N. Y., a corporation of New York No Drawing. Application December 20, 1941, Serial No. 423,837

10 Claims. (Cl. 106—57)

This invention relates to refractory compositions of general utility which are also suitable for use in contact with molten glass and more particularly to refractory compositions composed wholly or largely of refractory zirconium material such as zircon (zirconium silicate), or zirconia (zirconium oxide).

The object of the invention is to increase the corrosion resistance of zirconium refractories.

Another object of the invention is to produce a refractory composition which is more resistant than prior refractory compositions to corrosive attack of molten lime glass, that is, glass containing substantial amounts of lime and/or other second group oxides.

Another object is to cause maximum shrinkage of a zircon or zirconia refractory during the firing thereof and thereby to give the finished composition a very close and dense structure having low porosity.

To these and other ends, which may become apparent as the description proceeds, the invention comprises among its features the preparation of refractory compositions composed of zircon or zirconia to which are added minor and specific amounts of metallic oxides not heretofore used in such refractories, some of which have the unusual effect of increasing the corrosion resistance of the refractory body while others have a mineralizing effect or the ability to promote shrinkage on firing.

I have found that the addition of about 1% of vanadic oxide ($V_2O_5$) to a refractory consisting of zircon will substantially increase its resistance to corrosion by molten lime glass although the shrinkage on firing is not thereby substantially increased over that of the pure zircon refractory. That this effect depends upon a critical proportion of $V_2O_5$ is shown by the fact that amounts of $V_2O_5$ less than 0.5% and more than 1.2%, instead of increasing the corrosion resistance, actually decrease it.

Corrosion resistance is determined by vertically inserting a molded bar of the refractory into a batch of glass cullet contained in a crucible, the bar being 1 cm. square in cross section and sufficiently long to project above the surface of the glass when the latter is molten. The crucible and its contents are heated to melt the glass and the whole is held at about 1550° C. for fifteen hours. At the end of this time the crucible is cooled and the depth of the corrosion of the refractory bar at the metal line is measured. By means of this test the depth of corrosion by lime glass of a bar composed of pure zircon is 5 mm., that is, the bar is completely severed, while a similar bar containing about 1% of $V_2O_5$ is corroded to a depth of only 2 mm.

I have further found that the addition of about 1% of an oxide of iron, cobalt, nickel or manganese to pure zircon or zirconia refractory causes a shrinkage of the body when it is fired to 1550° C., which is substantially greater than the shrinkage of a similar body of pure zircon or zirconia alone under like conditions. With 1% of such oxide the maximum shrinkage effect is obtained and the use of higher percentages causes no further shrinkage. The shrinkage is determined by molding a bar of the refractory material approximately 15 cm. x 2 cm. x 1 cm., making two marks of reference thereon at a distance of 10 cm. from each other, firing the bar up to 1550° C. and measuring the distance between the reference marks after firing. The decrease in the distance between the marks of reference is calculated in terms of shrinkage in inches per inch of refractory and can also be expressed as percent shrinkage. The following table shows the percent shrinkage of the various compositions which I have found to be effective as compared with pure zircon and pure zirconia.

| Composition | Shrinkage when fired to 1550° C |
|---|---|
| | Percent |
| Pure zircon | 6 |
| Pure zirconia | 4 |
| 99% zircon, 1% $Fe_2O_3$ | 12 |
| 99% zircon, 1% $Co_2O_3$ | 11.2 |
| 99% zircon, 1% $Ni_2O_3$ | 9.4 |
| 99% zircon, 1% $MnO_2$ | 9.2 |
| 99% zircon, 1% $V_2O_5$ | 5–6 |
| 98% zircon, 1% $V_2O_5$, 1% $Fe_2O_3$ | 9 |
| 99% zirconia, 1% $Fe_2O_3$ | 7.5 |

Although $V_2O_5$ does not substantially change the shrinkage of the refractory, it greatly increases its resistance to corrosion as shown above. The oxides of iron, cobalt, nickel and manganese cause a substantial increase in shrinkage, thereby giving the refractory a more dense or less porous structure. Iron oxide, which is most effective in this respect, produces a shrinkage of about 12% in zircon refractory which in this composition results in about 9% porosity as compared to about 25% porosity for the pure zircon. In the zirconia refractory the increased shrinkage caused by the addition of iron oxide prevents the formation of cracks on firing. Such cracks are a particularly objectionable characteristic of zirconia refractories and have hitherto prevented its use except in small sized bodies. When these shrinkage promoting oxides are introduced into a zircon refractory together with about 1% of $V_2O_5$ the corrosion resistance is further increased by the resulting decrease in porosity, particularly when $Fe_2O_3$ is used with $V_2O_5$ as shown.

The benefits of my invention can be obtained only with the above recited modifying oxides. Other oxides which I have tried, including those of chromium, tungsten, silver, copper, antimony, calcium and magnesium are ineffective. It is significant that the effective oxides are those of the metals which fall in the fourth series or horizontal row of the periodic system of elements having an atomic weight between 50 and 59. For reasons not understood, the oxide of chromium which also falls within this range is ineffective. Therefore the latter oxide is excluded from the scope of the invention as claimed.

To obtain the maximum benefits of my invention, it is desirable to employ the materials in the finest possible state of subdivision in order that the modifying oxides will be distributed throughout the refractory body as uniformly as possible and will form the most intimate mixture with the zircon. Pure refined zircon having a maximum iron impurity not greater than about 0.1% $Fe_2O_3$ and so finely divided that about 99.9% thereof will pass a screen of 325 meshes per inch is a common product on the market and the above recited effective modifying oxides can also be obtained as extremely fine powders particularly by precipitation methods. Zirconia of equal purity and fineness can also be obtained. Such materials are particularly adapted for my process and are eminently suited for molding by the process known as slip casting. Consequently in the practice of my invention the refractory batch of such materials is preferably formed into a slip and molded by casting the slip in the usual manner in a porous mold, as is illustrated by the following example:

.75 lb. (34 liters) of water and .12 ounce of sodium silicate solution (sp. g. 1.31) are mixed uniformly with 5.00 lbs. of finely divided zircon (325 mesh). The sodium silicate functions as a deflocculant and, as is well known, substantially decreases the amount of water necessary to form a slip, thereby facilitating the drying of the cast article and decreasing the drying shrinkage. The above recited quantity of water amounts to approximately 15 cc. per 100 grams of dry batch and should not exceed about 17 cc. per 100 grams of batch. The desired modifying oxide or oxides, for example, about .05 lb. of vanadic acid and about .05 lb. of ferric oxide, is then added and the whole is agitated until uniform in consistency. The slip is then ready for casting in the usual manner by the technique which is well known in this art. After the cast body has properly set it is removed from the mold, dried slowly and fired.

The preparation of a zirconia refractory body in accordance with the invention is accomplished in the same manner as the preparation of a zircon refractory. On account of its greater density, however, zirconia will require only 11 cc. of water per 100 grams of dry batch to produce a slip by the above recited procedure.

Since the process permits the molding of various intricate shapes which would be difficult to accomplish by ramming or hand molding methods, the resulting bodies on account of their low porosities when fired can be used for a variety of purposes requiring contact with molten glass. They are particularly useful in contact with molten lime glass on account of their enhanced resistance to the corrosive action of such glass.

The introduction of iron oxide into the refractory compositions of this invention is not objectionable from the standpoint of discoloration of glass melted in contact therewith because the ultimate iron content is substantially no greater than that of ordinary refractories due to the initial purity of the zirconium materials. Therefore on account of the increased resistance to corrosion of my refractories, glass melted in contact therewith is actually less discolored by iron than in ordinary refractory bodies.

I claim:

1. A refractory composition comprising a major proportion of refractory zirconium material and about 1% of an oxide of vanadium.

2. A refractory composition comprising a major proportion of zircon and about 1% of vanadic oxide.

3. A refractory composition comprising over 98% of zircon and 0.5% to 1.2% of vanadic oxide.

4. A refractory composition comprising a major proportion of zircon, about 1% of vanadic oxide, and a small percentage of ferric oxide.

5. A refractory composition comprising a major proportion of zircon, about 1% of vanadic oxide and a small percentage of cobalt oxide.

6. A refractory composition comprising a major proportion of zirconia and about 1% of vanadic oxide.

7. A refractory composition comprising a major proportion of zircon, about 1% of vanadic oxide and about 1% of ferric oxide.

8. A refractory composition comprising a major proportion of zircon, about 1% of vanadic oxide and a small percentage of manganese oxide.

9. The method of making a refractory body suitable for use in contact with molten glass, which includes forming a slip comprising a major proportion of zircon, not more than about 17 cc. of water per 100 grams of solids, and about 1% of $V_2O_5$, molding the slip to form a body and firing the body at about 1550° C.

10. The method of making a refractory body suitable for use in contact with molten glass, which includes forming a slip comprising a major proportion of zircon, not more than about 17 cc. of water per 100 grams of solids and about 1% of $V_2O_5$ and about 1% of $Fe_2O_3$, molding the slip to form a body and firing the body at about 1550° C.

ROBERT KARL SMITH.

CERTIFICATE OF CORRECTION.

Patent No. 2,338,209. January 4, 1944.

ROBERT KARL SMITH.

It is hereby certified that error appears in the printed specification of the above numbered patent requiring correction as follows: Page 2, first column, line 45, for "(34 liters)" read --(.34 liters)--; and that the said Letters Patent should be read with this correction therein that the same may conform to the record of the case the Patent Office.

Signed and sealed this 28th day of March, A. D. 1944.

Leslie Frazer

(Seal) Acting Commissioner of Patents.